(12) United States Patent
Shim et al.

(10) Patent No.: US 9,928,967 B2
(45) Date of Patent: Mar. 27, 2018

(54) THREE-DIMENSIONAL COMPOSITES OF NICKEL COBALT OXIDE/ GRAPHENE ON NICKEL FOAM FOR SUPERCAPACITOR ELECTRODES, AND PREPARATION METHOD THEREOF

(71) Applicant: RESEARCH COOPERATION FOUNDATION OF YEUNGNAM UNIVERSITY, Gyeongsan-si, Gyeongsangbuk-do (KR)

(72) Inventors: Jae-Jin Shim, Daegu (KR); Van Hoa Nguyen, Gyeongbuk (KR)

(73) Assignee: Research Cooperation Foundation of Yeungnam University, Gyeongsan-si, Gyeongsangbuk-do (KR)

(*) Notice: Subject to any disclaimer, the term of this patent is extended or adjusted under 35 U.S.C. 154(b) by 0 days.

(21) Appl. No.: 15/238,724

(22) Filed: Aug. 17, 2016

(65) Prior Publication Data

US 2017/0053750 A1   Feb. 23, 2017

(30) Foreign Application Priority Data

Aug. 17, 2015  (KR) .................. 10-2015-0115491

(51) Int. Cl.
*H01G 11/46* (2013.01)
*H01G 11/36* (2013.01)
(Continued)

(52) U.S. Cl.
CPC .............. *H01G 11/46* (2013.01); *C25D 9/08* (2013.01); *C25D 13/02* (2013.01); *H01G 11/26* (2013.01);
(Continued)

(58) Field of Classification Search
CPC .......... C25D 13/02; C25D 9/08; H01G 11/26; H01G 11/36; H01G 11/46; H01G 11/70;
(Continued)

(56) References Cited

U.S. PATENT DOCUMENTS

2015/0340170 A1* 11/2015 Jun .................... C01B 31/0453
361/502
2016/0020040 A1* 1/2016 Zhao .................... H01G 11/86
427/80
(Continued)

FOREIGN PATENT DOCUMENTS

KR      10-1486429 B1    1/2015

OTHER PUBLICATIONS

Jian Wu, et al., "Ultrathin NiCo2O4 nanosheets grown on three-dimensional interwoven nitrogen-doped carbon nanotubes as binder-free electrodes for high-performance supercapacitors", Journal of Materials Chemistry A, May 28, 2015, pp. 15331-15338.
(Continued)

Primary Examiner — Mark Kopec
Assistant Examiner — Jaison P Thomas
(74) Attorney, Agent, or Firm — Revolution IP, PLLC

(57) ABSTRACT

Provided is a three-dimensional composite of nickel cobalt oxide/graphene on nickel foam as high-performance electrode materials for supercapacitors and a method for preparing the same, and the electrode comprising a three-dimensional nickel cobalt oxide/graphene on nickel foam exhibited an ultrahigh specific capacitance of 2,260 F/g at a current density of 1 A/g.

5 Claims, 7 Drawing Sheets

(51) Int. Cl.
  *H01G 11/26* (2013.01)
  *H01G 11/86* (2013.01)
  *C25D 9/08* (2006.01)
  *C25D 13/02* (2006.01)
  *H01G 11/70* (2013.01)

(52) U.S. Cl.
  CPC .............. *H01G 11/36* (2013.01); *H01G 11/70* (2013.01); *H01G 11/86* (2013.01); *Y02E 60/13* (2013.01)

(58) Field of Classification Search
  CPC .......... H01G 11/86; Y02E 60/13; H01B 1/02; H01B 1/08
  See application file for complete search history.

(56) References Cited

U.S. PATENT DOCUMENTS

2016/0268061 A1* 9/2016 Wang .................... C01G 45/02
2016/0284480 A1* 9/2016 Lim ....................... H01G 11/02

OTHER PUBLICATIONS

Shaolin Yang, et al., "Electrodeposition of porous graphene networks on nickel foams as supercapacitor electrodes with high capacitance and remarkable cyclic stability", Nanoscale Research Letters, Dec. 12, 2014.
Yazi Luo, et al., "Porous NiCo2O4-reduced graphene oxide (rGO) composite with superior capacitance retention for supercapacitors", Electrochimica Acta, 2014, pp. 332-337.

* cited by examiner

THREE-DIMENSIONAL COMPOSITES OF NICKEL COBALT OXIDE/ GRAPHENE ON NICKEL FOAM FOR SUPERCAPACITOR ELECTRODES, AND PREPARATION METHOD THEREOF

CROSS-REFERENCE TO RELATED APPLICATION

This application claims priority to and the benefit of Korean Patent Application No. 10-2015-0115491 filed in the Korean Intellectual Property Office on Aug. 17, 2015, the entire contents of which are incorporated herein by the reference.

BACKGROUND OF THE INVENTION (a) Field of the Invention

The present invention relates to a three-dimensional composite of nickel cobalt oxide/graphene on nickel foam as a high-performance electrode for supercapacitors and its preparation method.

(b) Description of the Related Art

A supercapacitor is an energy storage device for storing and supplying electrical energy by utilizing the capacitor behavior caused by an electrochemical reaction between an electrode and an electrolyte. Supercapacitors have superior energy density and power density than conventional electrolytic capacitor and secondary battery, respectively. They can store and supply a large quantity of energy quickly and therefore attracted considerable interest as a new concept of energy storage and power sources.

In general, a supercapacitor consists of electrode materials, current collector, an electrolyte, and a separator. Of these, the electrode material is the most important component and controls the overall electrochemical performance of the supercapacitor.

An ideal supercapacitor electrode material often requires many properties, including high specific surface area, well-controlled porosity, high electronic conductivity, desirable electroactive sites, high thermal and chemical stability, and low cost of raw materials and manufacturing.

Thus, far, considerable efforts have been made to develop a variety of active electrode materials for supercapacitors. Among them, transition metal oxides, which are known as pseudocapacitive materials, have attracted considerable attention. On the other hand, they often have low rate capability and poor stability, which hinders the rapid electron transport required for high charge/discharge rates.

SUMMARY OF THE INVENTION

The first object of the present invention is to provide a three-dimensional composite of nickel cobalt oxide/graphene on nickel foam as a high performance electrode for supercapacitors.

The second object of the present invention is to provide a high performance electrode for a supercapacitor made of the three-dimensional nickel cobalt oxide/graphene composite on nickel foam.

The third object of the present invention is to provide a method for preparing a three-dimensional composite of nickel cobalt oxide/graphene on nickel foam as high performance electrodes for supercapacitors.

To achieve the above objects, the present invention provides a three-dimensional composite of nickel cobalt oxide/ graphene on nickel foam comprised of a nickel foam with graphene sheets and nickel cobalt oxide nanoparticles that are formed on the nickel foam.

In addition, the present invention provides a high performance electrode for supercapacitors comprising a three-dimensional composite of nickel cobalt oxide/graphene on nickel foam comprised of a nickel foam with graphene sheets and nickel cobalt oxide nanoparticles that are formed on the nickel foam.

In addition, the present invention provides a method for preparing a three-dimensional composite of nickel cobalt oxide/graphene on nickel foam involving the following: (a) the formation of a graphene thin film by immersing nickel foam in a graphene oxide (GO) solution followed by electrodepositing; (b) the formation of nickel cobalt oxide nanoparticles by adding the nickel foam including the graphene thin film, in an electrolyte solution and adding a bimetallic hydroxide comprised of nickel and cobalt, followed by electrodepositing; and (c) calcination of the nickel foam including the graphene thin film and the nickel cobalt oxide nanoparticles.

DETAILED DESCRIPTION OF THE EMBODIMENTS

The present invention will be described more fully hereinafter with reference to the accompanying drawings, in which exemplary embodiments of the invention are shown.

The inventors of the present invention have sought an excellent electrode materials required for very high-performance supercapacitors and synthesized a three-dimensional nickel cobalt oxide/graphene/nickel foam ($Ni_xCo_yO_z$/G/NF) composite, which is a nickel foam modified with graphene sheet and nickel cobalt oxide nanoparticles. They have tested the performance and stability as an electrode of the electrochemical supercapacitor, and finally completed the present invention.

Hereinafter, an exemplary embodiment of the present disclosure will be described in detail.

The present invention provides a three-dimensional nickel cobalt oxide/graphene/nickel foam ($Ni_xCo_yO_z$/G/NF) composite comprised of a nickel foam with graphene sheets and nickel cobalt oxide nanoparticles that are formed on the graphene sheets.

The composite comprises 1 to 7 parts by weight of the graphene sheets and 10 to 50 parts by weight of the nickel cobalt oxide nanoparticles, in respect to 100 parts by weight of the nickel foam.

The graphene sheet performs a role of increasing the surface area and electrical conductivity and increasing the specific capacitance. If the amount falls beyond the range, a problem arises that the surface area is reduced, resulting in a reduction of the specific capacitance. Preferably, the graphene sheets have a mean thickness of 0.4 to 2 nm.

The resulting nanocomposite is $Ni_xCo_yO_z$/G/NF, wherein x and y are integers of $0<x\leq3$, z is an integer of $2\leq x\leq6$; an example thereof is $NiCo_2O_4$/G/NF. The metal oxide nanoparticles performed a role of increasing the surface area and capacitance. If the numbers of x and y fall beyond the above ranges, problems may arise such as the number of particles is too small or the particles aggregate to make a smaller surface area, causing a reduced capacitance. Preferably, the nickel cobalt oxide nanoparticles should have a mean diameter of 2 to 10 nm.

In addition, the present invention provides an electrode for a supercapacitor that is made of a three-dimensional nickel cobalt oxide/graphene/nickel foam ($Ni_xCo_yO_z$/G/NF) composite.

Figure 6:
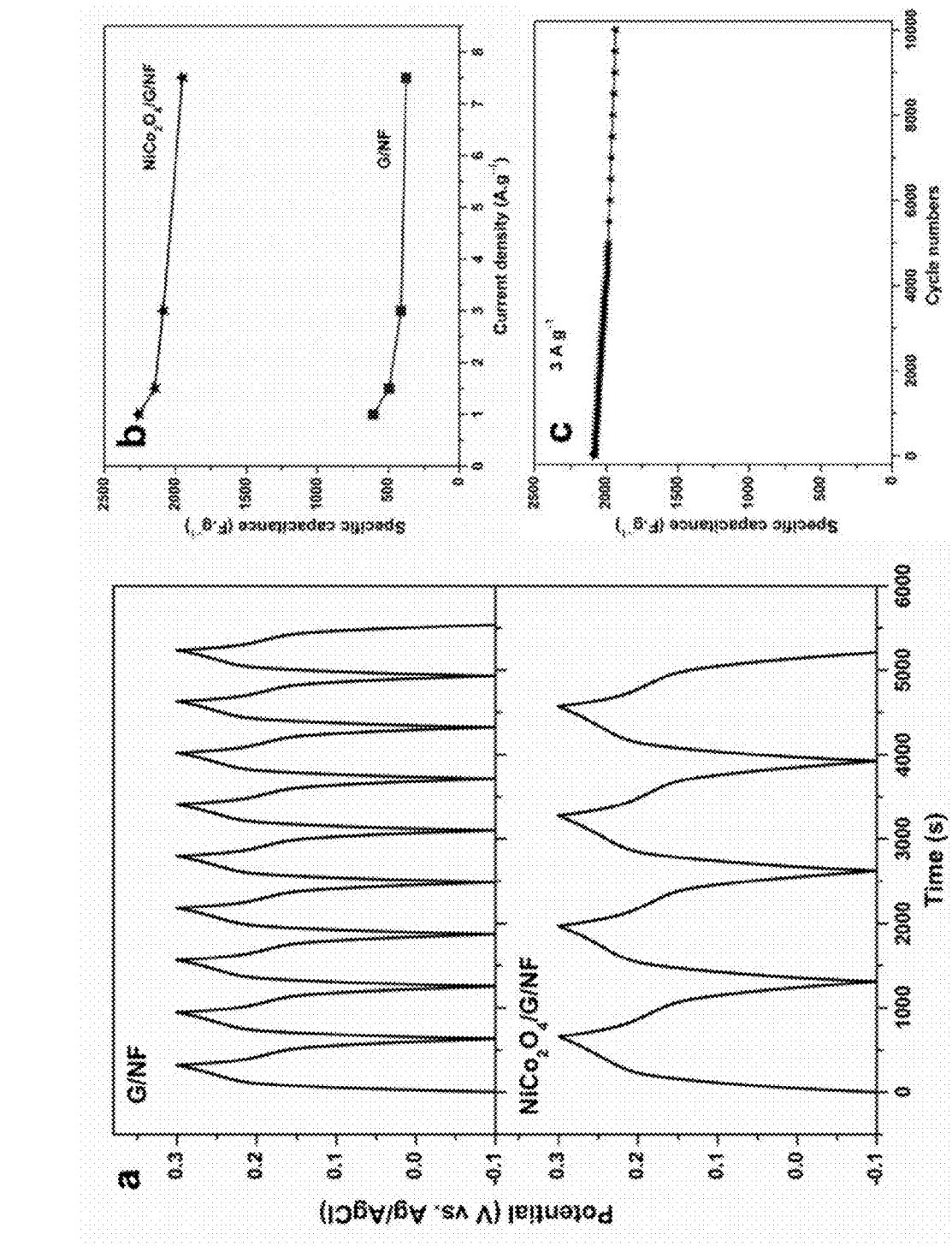
FIG. 6 shows the galvanostatic charge-discharge curves of $NiCo_2O_4$/G/NF electrode at a current density of 1 A/g (a); galvanostatic specific capacitance retention of $NiCo_2O_4$/G/NF electrode at different current densities (b); and the average specific capacitance versus the cycle number of the $NiCo_2O_4$/G/NF electrode at a current density of 3 A/g (c).

Shown in FIG. 6b, the electrode exhibits an ultrahigh specific capacitance of 2,260 F/g at a current density of 1 A/g and even at high current density, a high specific capacitance of 1,950 F/g was measured. Shown in FIG. 6c, supercapacitors based on these 3D composite electrodes possess excellent stability under repeated charge/discharge cycles. When the capacitor was charged and discharged for 10,000 cycles at a current density of 3 A/g, it retained 92.8% of its initial capacity. The capacitor showed an excellent stability under repeated charge/discharge cycles so that it can be very useful as an electrode for supercapacitors.

In addition, another aspect of the present invention provides a method of preparing a three-dimensional nickel cobalt oxide/graphene/nickel foam ($Ni_xCo_yO_z$/G/NF) composite comprising the following steps: (a) forming a graphene thin film by immersing nickel foam in a graphene oxide (GO) solution followed by electrodepositing; (b) forming nickel cobalt oxide nanoparticles by adding the nickel foam, including the graphene thin film in an electrolyte solution and adding bimetallic hydroxide of nickel and cobalt, followed by electrodepositing; and (c) calcining the nickel foam including the graphene thin film and nickel cobalt oxide nanoparticles.

Electrodeposition step (a) may be performed at 0.1 to 1 V for 5 to 15 min. If the voltage is beyond this range, the GO sheets do not attach well to the nickel foam, or the graphene layer is so thick that it becomes unstable and its specific surface area is reduced. Electrodeposition step (b) may be performed at −1.5 to −0.5 V for 5 to 15 min. If the voltage is beyond this range, the bimetallic oxide nanoparticles do not attach well to the graphene layer or the particles are aggregated into a larger size to unstable and to have a smaller surface area.

The electrolyte comprises nickel nitrate and cobalt nitrate at a molar ratio of 1:3 to 3:1. If the ratio is beyond this range, bimetallic hydroxide nanoparticles are not made properly or the particles are too large to attach to the graphene layer and can be detached from the graphene layer easily.

The calcination step (c) may be performed at a temperature of 200 to 350° C. for 1 to 5 h. If the condition is beyond the above range, metal hydrates cannot be converted to metal oxide well, the graphene is burned and decomposed, or the particles are aggregated.

Hereinafter, the present invention will be described in more detail by way of examples, i.e., three-dimensional $NiCo_2O_4$/graphene/nickel foam ($NiCo_2O_4$/G/NF) composite using $NiCo_2O_4$ as bimetallic (Ni, Co) oxides. The scope of this invention, however, is not limited by these examples.

<Example 1> Synthesis and Performance Analysis of Three-Dimensional $NiCo_2O_4$/Graphene/Ni Foam ($NiCo_2O_4$/G/NF) Composite 1. Synthesis of the Three-Dimensional $NiCo_2O_4$/G/NF Composite GO was prepared using an improved Hummers method (ACS Nano 4 (2010) 4806-4814) using graphite powder (Alfa Aesar, 99.995%). The nickel foam (NF) (1 cm×3 cm) was cleaned carefully with a 6M HCl solution with sonication for 30 min to remove the nickel oxide layer from the surface, and then rinsed with deionized water and absolute ethanol. The weight of nickel foam after treatment, as described above, was approximately 0.15 g. All electrodeposition experiments were performed on an Autolab potentiostat/galvanostat (PGSTAT-302N, Metrohm, Netherlands) in a standard three-electrode glass cell consisting of a clean Ni foam working electrode, a platinum plate counter electrode, and a saturated calomel reference electrode (SCE) at 25±1° C.

First, graphene was deposited on the NF using a modified method of the reported (J. Phys. Chem. Lett. 1 (2010) 1259-1263). Briefly, GO was dispersed in deionized water and sonicated for 2 h. The GO concentration, direct current voltage, and deposition time were 1.5 g/L, 0.5 V, and 10 min, respectively. Secondly, the bimetallic (Ni, Co) hydroxide was electrodeposited on the G/NF electrode in an aqueous 6 mM $Co(NO_3)_2 \cdot 6H_2O$ and 3 mM $Ni(NO_3)_2 \cdot 6H_2O$ solution at room temperature. The electrodeposition potential was −1.0 V (vs. SCE). After electrodeposition for 10 min, the supported Ni foam was rinsed several times with deionized water and absolute ethanol with sonication, and dried in air. Finally, the sample was placed in a quartz tube and calcined at 300° C. for 2 h at a ramping rate of 1° C./min to convert the hydroxide to $NiCo_2O_4$. Generally, 15 mg of the graphene sheets and $NiCo_2O_4$ was deposited per 1 cm×1 cm of Ni foam, and the percentage of graphene was approximately 10%.

Figure 1:
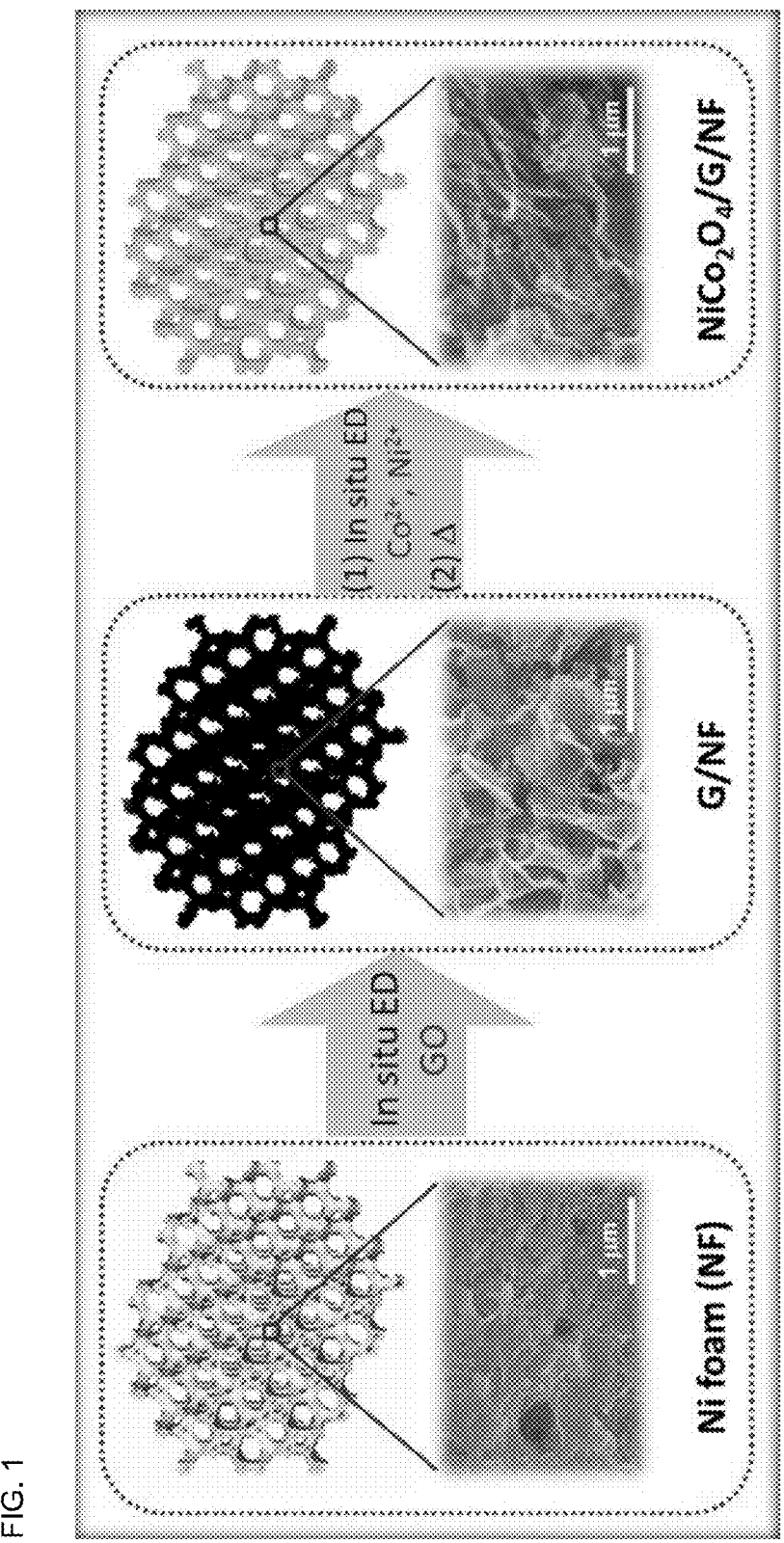
FIG. 1 shows an Illustrative fabrication process toward a three-dimensional nickel cobalt oxide/graphene/nickel foam ($Ni_xCo_yO_z$/G/NF) electrode according to an embodiment of the present invention.

FIG. 1 presents the synthetic scheme of the 3D $NiCo_2O_4$/G/NF electrode. First, the skeleton of the bare NF was covered with a thin graphene layer by electrodeposition using the NF electrode impregnated in a GO suspension. Note that GO can be deposited and reduced simultaneously to graphene using this process.

Secondly, a green bimetallic (Ni, Co) hydroxide was electrodeposited onto the NF support with graphene. In this step, when an electric current passes through the electrolyte containing a nickel and cobalt nitrate solution with a molar ratio of 1:2, the $NO_3^-$ anions could be reduced to $OH^-$ anions on the cathodic surface. These OK anions would react with $Ni^{2+}$ and $Co^{2+}$ cations to form a uniform precipitate of a mixed metal (Ni, Co) hydroxide on the G/NF surface. The solubility product constant ($K_{sp}$) at 25° C. of $Co(OH)_2$ ($2.5\times10^{-16}$) was similar to that of $Ni(OH)_2$ ($2.8\times10^{-16}$). The entire process described above can be described by the following equations:

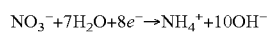

$$xNi^{2+}+2xCo^{2+}+6xOH^-\rightarrow Ni_xCo_{2x}(OH)_{6x}$$

In the final step, the as-formed hydroxides were transformed thermally to NiCo₂O₄ supported on a G/NF support, as described by the following oxidation reaction:

$$2Ni_xCo_{2x}(OH)_{6x}+xO_2\rightarrow 2xNiCo_2O_4+6xH_2O$$

Figure 2:
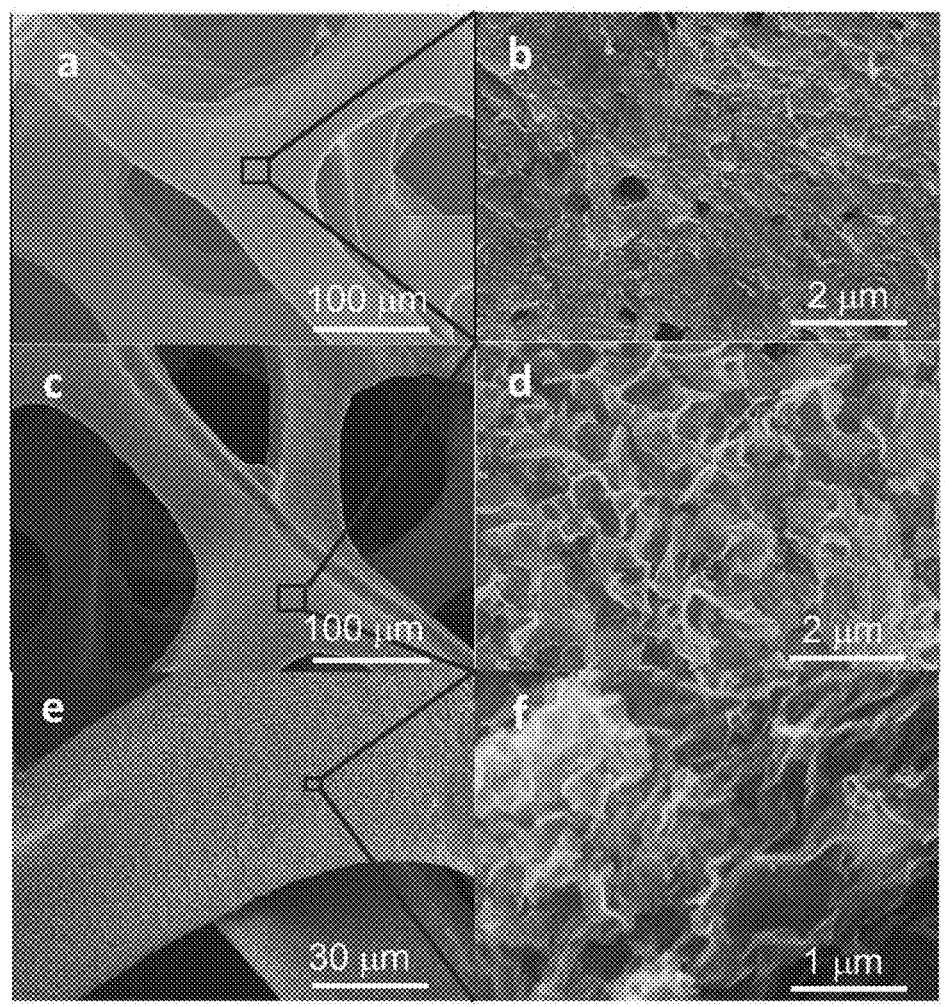
FIG. 2 shows SEM images of bare Ni foam (a, b), Ni foam covered with graphene (c, d), and the $NiCo_2O_4$/G/NF composite (e, f).

FIG. 2 shows the morphology of the surface of Ni foam before and after the electrodeposition and thermal treatment processes. As shown in FIG. 2a and FIG. 2b, the bare NF presents a three-dimensional, porous and crosslinked grid structure, and a honeycomb-like surface. Through electrodeposition and thermal treatment, the NF was covered with an ultrathin mesoporous layer of graphene and NiCo₂O₄. As shown in FIG. 2c and FIG. 2e, the 3D grid structure with hierarchical macro-porosity could still be observed in the bare NF by low-magnification SEM. On the other hand, the high-magnification top-view images revealed the porous structure of graphene (FIG. 2d) and NiCo₂O₄ layers (FIG. 2f), which were coated on a skeleton of NF.

2. Performance Analysis of Three-Dimensional NiCo₂O₄/G/NF Composite

The samples were characterized by scanning electron microscopy (SEM, Hitachi, S-4200), transmission electron microscopy (TEM, Philips, CM-200) at an acceleration voltage of 200 kV, X-ray diffraction (XRD, PANalytical, X'Pert-PRO MPD) using CuKα radiation, and X-ray photoelectron spectroscopy (XPS, ULVAC-PJI, Quantera SXM) using AlKα monochromatized radiation.

Figure 3:
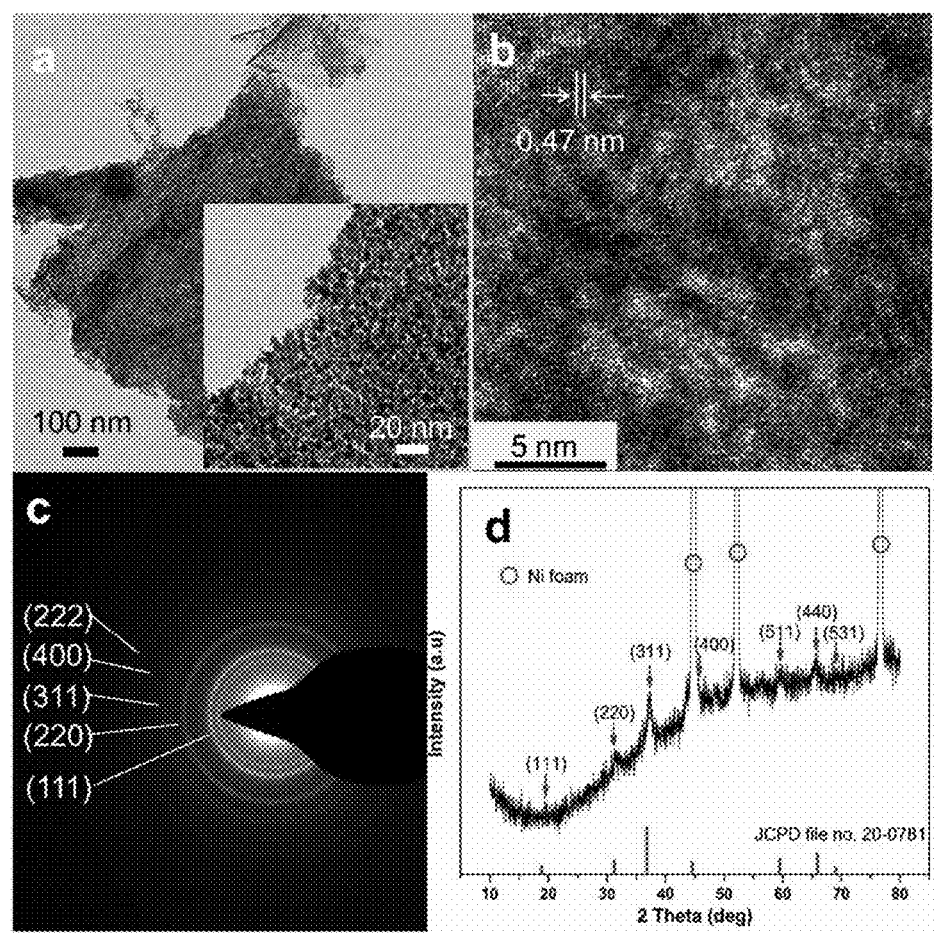
FIG. 3 shows TEM images (a, b), HRTEM images (c), and SAED pattern (d), of the $NiCo_2O_4$/G/NF electrode.

FIG. 3 presents TEM of the NiCo₂O₄/G nanosheets on the surface of the NiCo₂O₄/G/NF electrode, which was performed to characterize the composite morphology more clearly. As shown in FIG. 3a, the wrinkled surface and folded edges of the graphene sheets were clearly visible. The surface of the graphene sheets was decorated completely with nanoparticles with a size of ca. 3-5 nm, as observed from the high resolution TEM image. The spacing between the adjacent fringes was approximately 0.47 nm, which is close to the theoretical interplane spacing of the spinel NiCo₂O₄ (111) planes (FIG. 3b). Therefore, the very thin nanosheets consist of 3-6 layers of NiCo₂O₄ and graphene sheets. As shown in FIG. 3c, the selected-area electron diffraction pattern revealed well-defined diffraction rings, suggesting their polycrystalline characteristics. FIG. 3d shows a wide-angle XRD pattern of the mesoporous NiCo₂O₄ and graphene nanosheets supported on the NF electrode. With the exception of the three typical peaks assigned to the Ni substrate, seven other well defined XRD peaks were observed: 19.1, 31.4, 37.6, 45.1, 59.6, 65.2, and 69.1° 2θ with hkl values of (111), (220), (311), (400), (511), (440), and (531), which are representative of the spinel NiCo₂O₄ crystalline structure (JCPDF file no. 20-0781). FIG. 3d presents these peaks along with the standard peaks shown as red lines.

Figure 4:
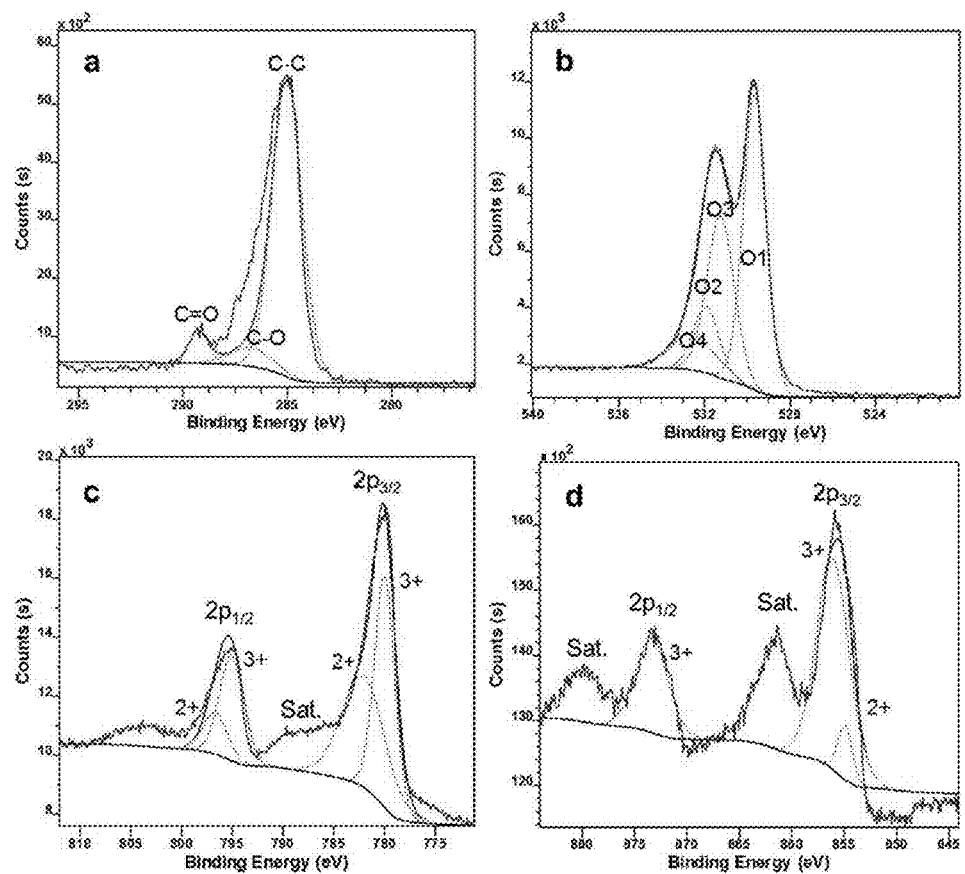
FIG. 4 shows XPS spectra of the $NiCo_2O_4$/G/NF electrode.

XPS was performed to provide surface information and to characterize the oxidation states of the NiCo₂O₄/G/NF electrode. FIG. 4 shows the core-level C 1s, O 1s, Co 2p, and Ni 2p peaks. The C1s spectrum shows a dominant peak centered at 284.8 eV with two weak peaks at 286.5 and 288.8 eV. Regarding the origins of the C is peaks, the peak at 284.6 eV was assigned to the binding energy of the $sp^2$ C—C bonds. The peaks at approximately 286.7 and 288.7 eV corresponds to C—O bonds in the epoxy/ether groups and C=O bonds in the ketone/carboxylic groups, respectively. These results confirm the reduction of GO. The high resolution spectrum for the O 1s region (FIG. 4b) could be deconvoluted to four peaks at binding energies of 529.6, 530.2, 531.5, and 532.1 eV, which are denoted as $O_I$, $O_{II}$, $O_{III}$, and $O_{IV}$, respectively. The component, $O_I$, corresponds to typical metal-oxygen bonds. The component, $O_{II}$, is normally associated with oxygen in the hydroxyl groups on the surface of NiCo₂O₄. The $O_{III}$ component can be attributed to a larger number of defect sites with a low oxygen coordination normally observed in materials with small particles. The $O_{IV}$ component corresponds to the multiplicity of physi- and chemisorbed water at or near the surface. The Co 2p spectrum (FIG. 4c) was fitted with two spin-orbit doublets, which are characteristic of Co²⁺ and Co³⁺, and one shake-up satellite. The Ni 2p peak was also fitted with two spin-orbit doublets, which are characteristic of Ni²⁺ and Ni³⁺, and two shake-up satellites (FIG. 4d). XPS showed that the surface of the NiCo₂O₄ has a composition containing Co²⁺, Co³⁺, Ni²⁺, and Ni³⁺. The atomic ratio of Co to Ni in the composite was approximately 2.5:1.2, which is very close to that in the precursor electrolyte.

<Example 2> Performance Analysis of Three-Dimensional NiCo₂O₄/G/NF Electrode

The NiCo₂O₄/G/NF prepared in the above Example 1 were used directly as the working electrode for the following electrochemical tests by CV, chronopotentiometry, and electrochemical impedance spectroscopy, which were performed using an Autolab PGSTAT302N (Metrohm, Netherlands). All measurements were carried out in a three-electrode cell with a working electrode, a platinum plate counter electrode and an SCE as the reference electrode at room temperature. The electrochemical impedance spectroscopy tests were carried out with a frequency loop from 10⁵ Hz to 0.01 Hz with perturbation amplitude of 5 mV at 0.2 V vs. saturated calomel electrode. The electrolyte was a 3 M aqueous KOH solution. The specific capacitance (Cs) of the Ni foam-supported electrode was calculated from the chronopotentiometry curves using the following equation:

$$C=It/m\Delta V$$

where C, I, t, m, and ΔV denote the specific capacitance (F/g) of the electrodes, discharging current (A), discharging time (s), mass of active materials (g), and discharging potential range (V), respectively.

Figure 5:
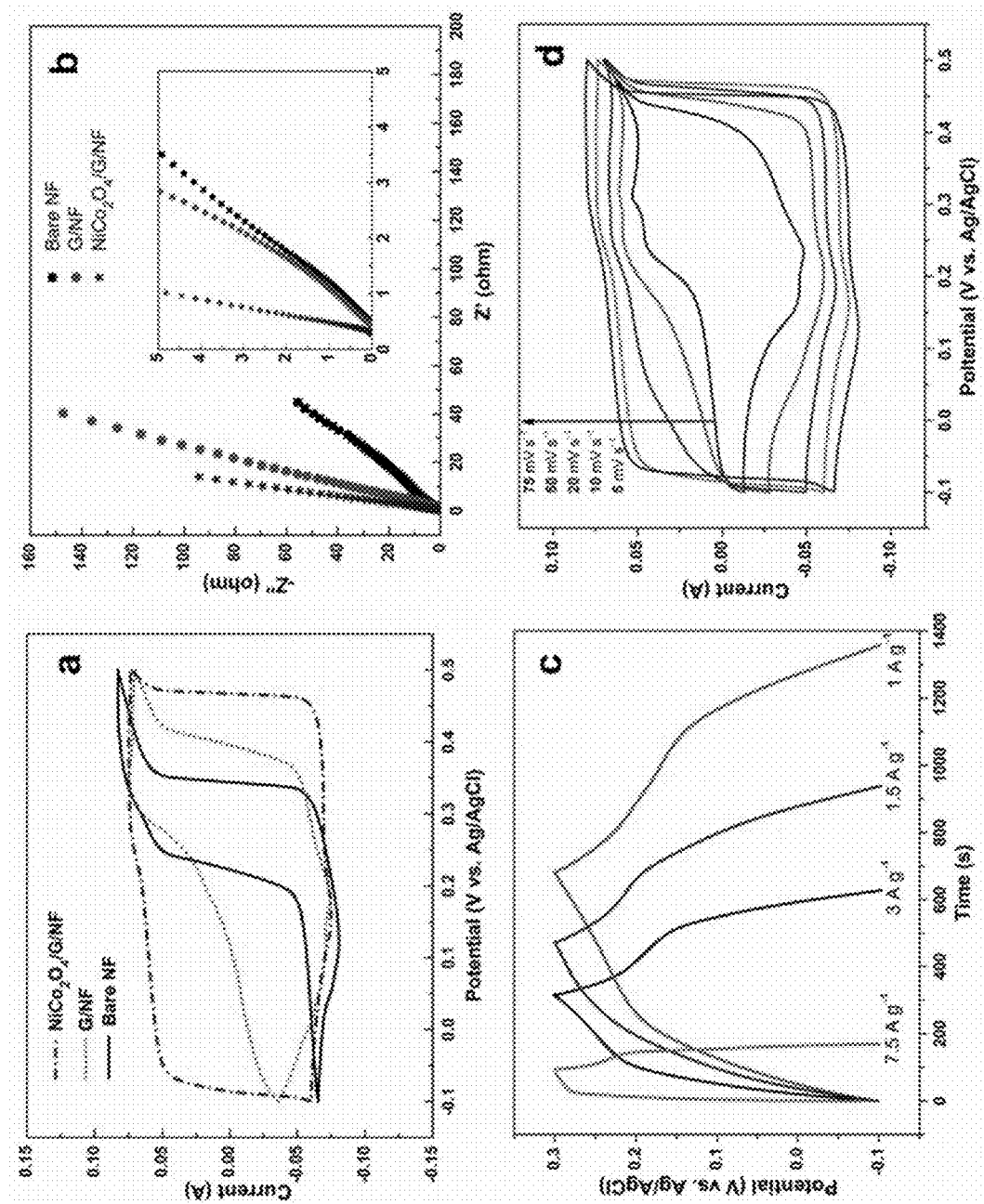
FIG. 5 shows cyclic voltammetry (CV) curves (a); impedance curves (b); galvanostatic charge-discharge curves (c) of $NiCo_2O_4$/G/NF electrode; and CV curves of the $NiCo_2O_4$/G/NF electrode at different scan rates (d).

FIG. 5a presents CV curves of the bare NF, G/NF, and NiCo₂O₄/G/NF electrodes at the same scan rate of 50 mV/s. The NiCo₂O₄/G/NF electrode exhibited a much wider current response and a more rectangular shape than those of the bare NF and G/NF electrode, confirming the greatly improved electrochemical performance. This is caused by the high conductivity of the ultrathin mesoporous NiCo₂O₄ that facilitates electron transport and enhances the electrochemical utilization of graphene. FIG. 5b presents the impedance curves of bare NF, G/NF, and NiCo₂O₄/G/NF electrodes measured in a 3M KOH electrolyte solution at the open circuit potential in a range of 0.01-10⁵ Hz. The NiCo₂O₄/G/NF electrode exhibited the lowest Rs of the electrochemical system, and the most vertical line in both low and high frequency regions, which might be due to the advantageous structure of the present electrode. The ultrathin and mesoporous characteristics of the graphene and NiCo₂O₄ layers endowed a very high surface area, which could provide numerous electroactive sites for the redox reaction. The open space between these ultrathin layers could serve as a robust reservoir for ions, and greatly enhance the penetration of the electrolyte within the electrode. In addition, this mesoporous structure of electrode surface ensured efficient contact between the surface of the active materials and the electrolyte. In addition, the direct growth of the graphene and $NiCo_2O_4$ layers with good intrinsic electrical conductivity and robust adhesion to the bare conductive NF substrate could allow the rapid transportation of electrons.

FIG. 5c obtained by the galvanostatic charge-discharge tests that were performed at different current densities for the $NiCo_2O_4$/G/NF electrode. A pair of small platforms is the typical characteristic of the existence of redox reactions during the charge-discharge process. FIG. 5d shows an almost rectangular shape at all scan rates, suggesting that the electrode exhibited low resistance and acted as an ideal supercapacitor.

Figure 7:
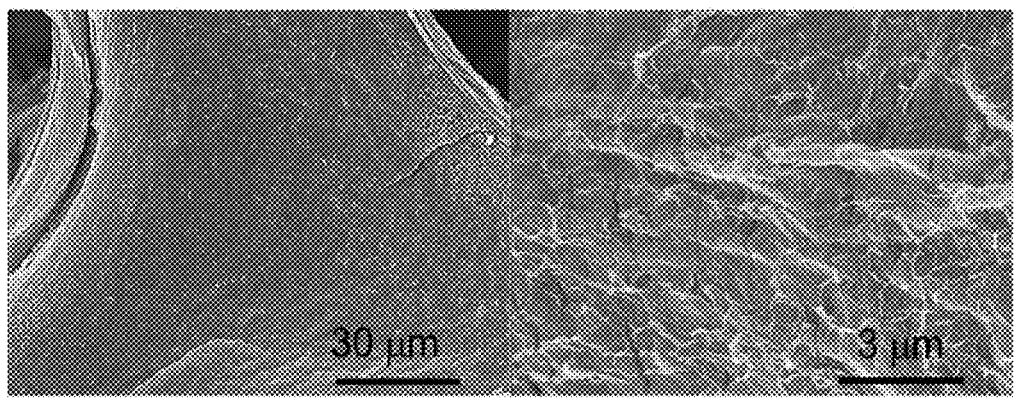
FIG. 7 shows SEM images of the $NiCo_2O_4$/G/NF electrode at different magnifications after 10000 cycles.

FIG. 6a shows the enhanced charge/discharge time of the $NiCo_2O_4$/G/NF electrode compared with the G/NF electrode at the same current density. FIG. 6b summarizes the specific capacitance at different current densities calculated from the charge-discharge curves. The $NiCo_2O_4$ layer yielded enhanced capacitance performance with approximately 270% increase in specific capacitance compared with that of the G/NF electrode. In particular, the $NiCo_2O_4$/G/NF electrode exhibited an ultrahigh specific capacitance of 2260 F/g at a current density of 1 A/g and showed excellent rate performance, i.e., about 85% capacitance (1950 F/g of specific capacitance) remained even applying a current rate of 7.5 A/g. As shown in FIG. 6c, when the capacitor was charged and discharged for 10000 cycles at a rate of 3 A/g, it retained 92.8% of its initial capacitance, which confirms that supercapacitors based on these 3D composite electrodes possess excellent stability under repeated charge/discharge cycles. FIG. 7 presents SEM images of the $NiCo_2O_4$/G/NF electrode at different magnifications after 10000 cycles; the mesoporous structure changed its morphology and a solid-electrolyte interface layer was formed on the surface of the electrode.

An electrode comprising a three-dimensional $Ni_xCo_yO_z$/G/NF composite according to the present invention exhibited an ultrahigh specific capacitance of 2,260 F/g at a current density of 1 A/g, making it potentially very useful as an electrode for electrochemical supercapacitors. In particular, the composite can be obtained using a very simple and efficient process.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for preparing a three-dimensional composite of nickel cobalt oxide/graphene on nickel foam comprising the steps of:
   (a) forming a graphene oxide thin film by immersing nickel foam in a graphene oxide solution and electrodepositing simultaneously;
   (b) forming nickel cobalt hydroxide nanoparticles on the top of graphene oxide layer by adding the nickel foam covered with the graphene oxide thin film in an electrolyte solution mixed with bimetallic nickel and cobalt hydroxide and electrodepositing simultaneously; and
   (c) calcining the nickel foam covered with the graphene oxide thin film and nickel cobalt hydroxide nanoparticles.

2. The method for preparing a three-dimensional composite of nickel cobalt oxide/graphene on nickel foam according to claim 1, wherein the electrodeposition step (a) is performed at 0.1 to 1 V for 5 to 15 min.

3. The method for preparing a three-dimensional composite of nickel cobalt oxide/graphene on nickel foam according to claim 1, wherein electrodeposition step (b) is performed at −1.5 to −0.5 V for 5 to 15 min.

4. The method for preparing a three-dimensional composite of nickel cobalt oxide/graphene on nickel foam according to claim 1, wherein the electrolyte comprises nickel nitrate and cobalt nitrate at a molar ratio of 1:3 to 3:1.

5. The method for preparing a three-dimensional composite of nickel cobalt oxide/graphene on nickel foam according to claim 1, wherein the calcination step (c) is performed at a temperature of 200 to 350° C. for 1 to 5 h.

* * * * *